United States Patent
Mays

(10) Patent No.: US 7,996,231 B2
(45) Date of Patent: Aug. 9, 2011

(54) SPEECH ACTIVATED DOOR OPERATOR SYSTEM

(75) Inventor: Wesley M. Mays, Coppell, TX (US)

(73) Assignee: Overhead Door Corporation, Dallas, TX (US)

( * ) Notice: Subject to any disclaimer, the term of this patent is extended or adjusted under 35 U.S.C. 154(b) by 0 days.

(21) Appl. No.: 11/700,629

(22) Filed: Jan. 31, 2007

(65) Prior Publication Data

US 2007/0132413 A1    Jun. 14, 2007

Related U.S. Application Data

(63) Continuation of application No. 09/909,400, filed on Jul. 19, 2001, now Pat. No. 7,194,412.

(51) Int. Cl.
*G10L 15/00* (2006.01)
(52) U.S. Cl. .... 704/275; 704/270; 704/273; 340/825.29
(58) Field of Classification Search .................. 704/270, 704/275, 273; 340/825.29
See application file for complete search history.

(56) References Cited

U.S. PATENT DOCUMENTS

| | | | |
|---|---|---|---|
| 4,450,545 A | 5/1984 | Kishi et al. | |
| 4,520,576 A | 6/1985 | Vander Molen | |
| 5,668,929 A | 9/1997 | Foster, Jr. | |
| 5,835,894 A | 11/1998 | Adcock et al. | |
| 5,983,186 A * | 11/1999 | Miyazawa et al. | 704/275 |
| 6,070,140 A | 5/2000 | Tran | |
| 6,118,243 A | 9/2000 | Reed et al. | |
| 6,140,939 A | 10/2000 | Flick | |
| 6,161,005 A | 12/2000 | Pinzon | |
| 6,161,094 A | 12/2000 | Adcock et al. | |
| 6,317,714 B1 * | 11/2001 | Del Castillo et al. | 704/270 |
| 6,380,842 B1 | 4/2002 | Mattes et al. | |
| 6,397,186 B1 | 5/2002 | Bush et al. | |
| 6,526,381 B1 | 2/2003 | Wilson | |
| 6,581,036 B1 * | 6/2003 | Varney, Jr. | 704/275 |
| 6,587,052 B1 * | 7/2003 | Flick | 340/825.69 |
| 6,661,350 B1 * | 12/2003 | Rohrberg et al. | 340/825.69 |
| 7,194,412 B2 | 3/2007 | Mays | |
| 2003/0093281 A1 * | 5/2003 | Geilhufe et al. | 704/275 |
| 2003/0118187 A1 * | 6/2003 | Fitzgibbon | 380/270 |
| 2004/0143766 A1 * | 7/2004 | Fitzgibbon et al. | 713/202 |
| 2005/0088281 A1 * | 4/2005 | Rohrberg et al. | 340/5.71 |

OTHER PUBLICATIONS

L. Torvik, Biomed Sci Instrum. (1993) 29:275-81.

* cited by examiner

*Primary Examiner* — Daniel D Abebe
(74) *Attorney, Agent, or Firm* — Gardere Wynne Sewell, LLP

(57) ABSTRACT

A barrier operator system, such as a garage door operator system, includes one or more remote control units, such as an inside remote control unit, an external wall mounted remote control unit and portable vehicle disposed remote control units which include speech recognition modules for recognizing spoken command signals to open or close a garage door or energize or de-energize lighting associated with the garage. The speech recognition modules are operably connected to interface or microcontroller circuits for operating a radio frequency transmitter for sending signals to operate lighting, and/or the barrier operator to move a barrier between open and closed positions, and possibly perform other functions.

25 Claims, 7 Drawing Sheets

SPEECH ACTIVATED DOOR OPERATOR SYSTEM

CROSS REFERENCE TO RELATED APPLICATION

This application is a continuation of application Ser. No. 09/909,400, filed Jul. 19, 2001, now U.S. Pat. No. 7,194,412.

BACKGROUND OF THE INVENTION

The development of voice or speech recognition systems for use in various applications involving human endeavor has provided convenience and security. Heretofore, however, control systems for operating barriers, such as residential and commercial upward acting garage doors and similar barriers, have not enjoyed the improvements provided by human voice or speech recognition devices.

Barrier operator systems, such as garage door operators, could well benefit from systems which may be operated by human voices speaking to a control device to cause opening and closing of garage doors, in particular. For example, residential and commercial garage doors may provide for added security and convenience of operation if operated by speaker dependent or speaker independent speech activated controllers, including controllers which may also be manually actuated. Such types of controllers are useful for placement within an enclosure or room which is closed by the door, disposed exterior of the room closed by the door or as portable remote control or command units. It is to these ends that the present invention has been developed.

BRIEF SUMMARY OF THE INVENTION

The present invention provides an improved barrier operator system, such as a residential or commercial garage door operator system.

The present invention also provides an improved barrier operator system characterized as a garage door operator system which may be controlled to open and close a garage door by human voice commands.

In accordance with one aspect of the present invention, a door operator system is provided which includes one or more remote control units which may be human speech activated to transmit a hard wire carried or radio frequency carried signal to an operator and associated base controller for moving a door between open and closed positions.

In accordance with another aspect of the present invention, a door operator system is provided which includes a stationary speech activated controller for effecting operation of a garage door operator through its base controller.

Still further, the present invention provides a door operator system which includes a speech activated controller mounted on the exterior of a structure, or at least exterior of an enclosure, which is closed by a door controlled by the operator system.

The door operator system of the present invention provides a completely hands free operation option available to a person authorized to open or close the door. The operator system may be programmed to recognize only keywords and be speaker dependent as well as speaker independent with respect to the keywords. Alternatively, the operator system may be speaker dependent and operable when receiving any voice command from a preauthorized speaker to control operation of a garage door. A speech activated controller may be associated with conventional controllers, both stationary and portable, which are essentially modified to include a microphone, a speaker, and speech recognition and activation circuitry.

Those skilled in the art will further appreciate the superior features of the invention as well as other important aspects thereof upon reading the detailed description which follows in conjunction with the drawings.

DETAILED DESCRIPTION OF THE PREFERRED EMBODIMENTS

Figure 2:
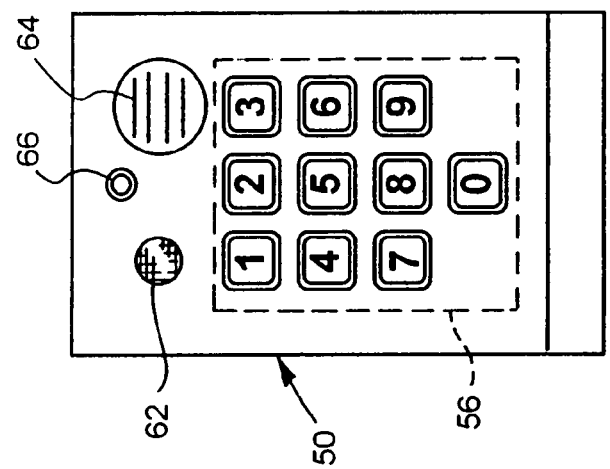
FIG. 2 is a front elevation of a fixed exterior controller in accordance with the speech activated control system of the present invention.

In the description which follows like elements are marked throughout the specification and drawings with the same reference numerals, respectively. The drawing figures are in somewhat generalized or schematic form in the interest of clarity and conciseness.

Figure 1:
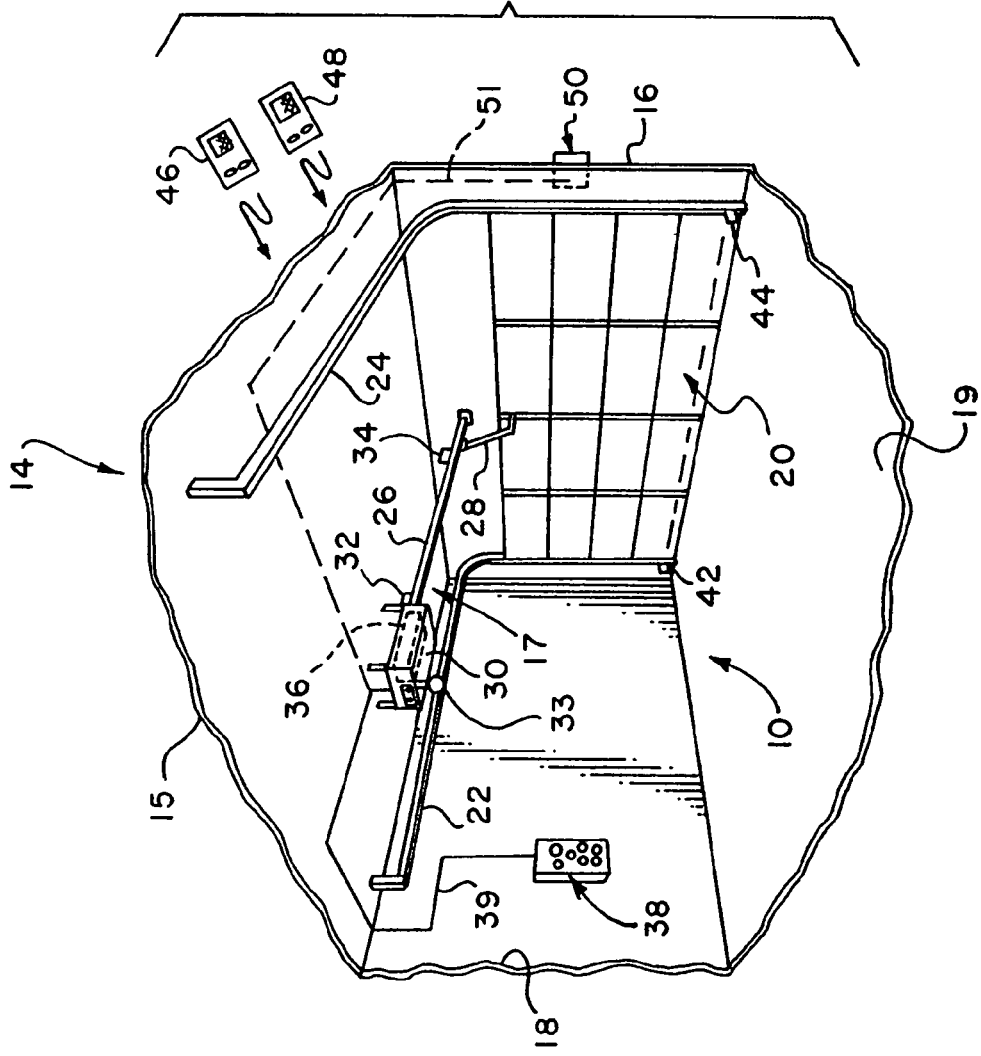
FIG. 1 is a perspective view of a residential garage door and operator system therefor and including speech activated controllers in accordance with the present invention.

Referring to FIG. 1, there is illustrated a speech activatable door operator system 10 in accordance with the invention for operating an upward acting barrier or door 20 which is moveable between a closed position shown and an open position on conventional spaced apart guide tracks 22 and 24. Barrier or door 20 is operable to form a closure for a room or garage 14 defined in part by ceiling 15, walls 16 and 18, and floor 19. Door 20 is adapted to be moved between open and closed positions by an operator 17 including a mechanism supported on an elongated member 26 and connected to a link 28 which is also connected to the door. The aforementioned mechanism is operably connected to a drive motor unit 30. The operator 17 may be of the type described in U.S. Pat. No. 6,118,243 issued Sep. 12, 2000 to Brett A. Reed et al and assigned to the assignee of the present invention. The operator 17 is controlled by a base controller 36 which may be of a type described in the aforementioned U.S. Pat. No. 6,118,243, which is incorporated herein by reference.

Figure 3:
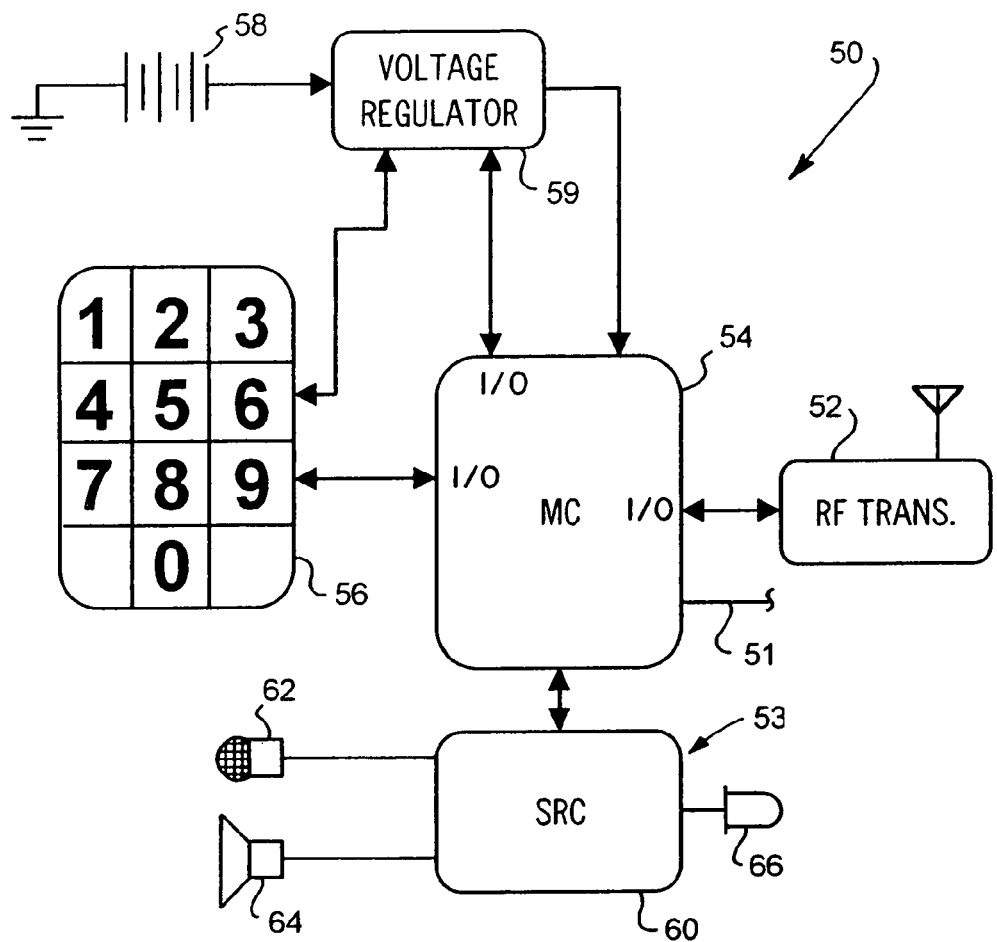
FIG. 3 is a generalized schematic diagram of the speech activated controller shown in FIG. 2.

Base controller 36 is adapted to respond to signals from mechanism limit switches 32 and 34 and to a signal from an obstruction detector 42, 44 for controlling operation of the door 20. Base controller 36 is also operable to energize and deenergize lighting 33 and is operably associated with a first speech activated controller 38 mounted on wall 18 within the enclosure or garage 14, one or more portable remote speech activated controller units 46 and 48 and an exterior mounted speech activated controller unit 50, see FIG. 2 also. Controllers 38 and 50 may be hardwired to the base controller 36 or operably associated therewith through radio frequency transmission. For example, as shown in FIG. 1, the controller 50 may be connected to the base controller 36 via hardwiring 51. Alternatively, as shown by the diagram of FIG. 3, the controller 50 may include a radio frequency transmitter 52 operable to communicate with a receiver of base controller 36 by radio frequency signal transmission. As mentioned previously, the operator 17, including the base controller 36, may be of the type disclosed in U.S. Pat. No. 6,118,243, which includes a radio frequency receiver. As shown in FIG. 1, the controller 38 is also preferably hardwired to the base controller 36 by way of suitable conductor means 39. Alternatively, as described below, the controller 38 may communicate with the base controller 36 via radio frequency (RF) communication means.

Referring now to FIG. 3, there is illustrated a generalized schematic diagram of the controller 50. The controller 50 preferably includes a microcontroller 54 operably connected to transmitter 52, a digital keypad 56 and to a source of power, such as a battery 58, by way of a suitable voltage regulator 60. The microcontroller 54 may be of a type commercially available such as an 8 bit CMOS microcontroller unit with an EEPROM data memory. Such a unit may be operably connected to the keypad 56 wherein pre-authorized multidigit codes may be input to effect operation of the controller 50 to send a suitable signal to the transmitter 52 or via hardwire 51 to base controller 36 to effect operation of a light 33, FIG. 1, and/or opening or closing of the door 20.

Alternatively, and in accordance with the present invention, the microcontroller 54 is also operably connected to a speech activation unit 53 including a human voice or speech recognition circuit (SRC) or module 60 operably connected to a microphone 62 and an audio speaker 64. A visual function indicator light, such as a suitable LED 66, is also connected to the speech activation unit 53 for indicating when an acceptable voice command has been input to the module 60. The speech recognition circuit or module 60 may also be of a type commercially available, such as a microcontroller type unit available from Sensory Inc. of Santa Clara, Calif., as one of their VOICE DIRECT 364 modules. The speech activation unit 53 may be programmed to recognize a predetermined number of words in a speaker dependent or speaker independent mode for controlling operation of the operator 17 through the base controller 36. The speech recognition circuit or module 60 is operably connected to the microcontroller 54 whereby the module 60 may be placed in a mode to recognize a word or words spoken into the microphone 62 by actuating a selected one of the keypad switches (0-9) of the keypad 56. Moreover, the circuit or module 60 may be placed in a training mode by actuation of another one of the keypad switches (0-9) of the keypad 56. Still further, the circuit or module 60 may be reset by actuation of yet another one of the keypad switches (0-9) of keypad 56. Alternatively, the module 60 may be operably connected to a separate set of "reset", "train" and "recognize" switches, not shown. The circuit or module 60 may also be of being operated in the so-called continuous listening mode which is operable to recognize a single word or a predetermined number of words without actuation of a "recognition" switch. If a continuous listening type circuit or module 60 is utilized, a continuous listening condition of the module must be created by actuation of a still another of the keypad switches (0-9) to place the circuit in a mode for continuous listening for a particular spoken word or words. A fourth switch, not shown, may be directly connected to the circuit or module 60.

Accordingly, the controller 50 may be operated by inputting a command through the keypad 56 wherein a predetermined number of access codes may be stored in the microcontroller 54 by the owner or a person authorized to operate the garage door 20 so that, for example, authorization codes may be given to persons known to the owner of the garage 14 for one or more entry events. For example, the microcontroller 54 may be configured to accept a particular multidigit code input through the keypad 56 for a limited number of times of actuation. Still further, as mentioned above, the keypad 56 may be used to condition the speech activation unit 53 to be operable to send a signal via the microcontroller 54 and the radio frequency transmitter 52 or hardwire 51 to the base controller 36 when a speaker dependent or speaker independent word or words are spoken within listening range of the microphone 62.

The controller 50 may also be operated in the speech activation mode wherein light 33 may be controlled and the door 20 may be controlled to move between open and closed positions by a person speaking a particular word or words to effect an operating command. For example, a person addressing the controller 50 may speak a predetermined gateway word followed by the word "lights" and effect operation of the circuit 60, the microcontroller 54 and the radio frequency transmitter 52 to transmit a signal to the base controller 36 to effect operation of exterior lights, not shown, and/or the interior light 33, FIG. 1, mounted on the operator 30. Of course, the circuit or module 60 may be pre-programmed to also recognize the words "open door" or "close door" or simply the words "open" or "close" to effect operation of the door 20 after speaking a gateway word or words, for example. If the circuit or module 60 recognizes the spoken word or words, the indicator light 66 will illuminate. If the circuit or module 60 does not recognize the spoken word, the speaker (person) may be given verbal instructions by the controller 50 via the module 60 and audio speaker 64 to repeat the word a predetermined number of times in the operating or recognition mode of the controller. Accordingly, the controller 50 may be operated by human speech activation or by inputting a command through the keypad 56 using a pre-programmed code which will effect operation of the base controller 36 to open or close the door 20 or to energize or de-energize lighting associated with the operator 30, such as the light 33 shown in FIG. 1.

Figure 4:
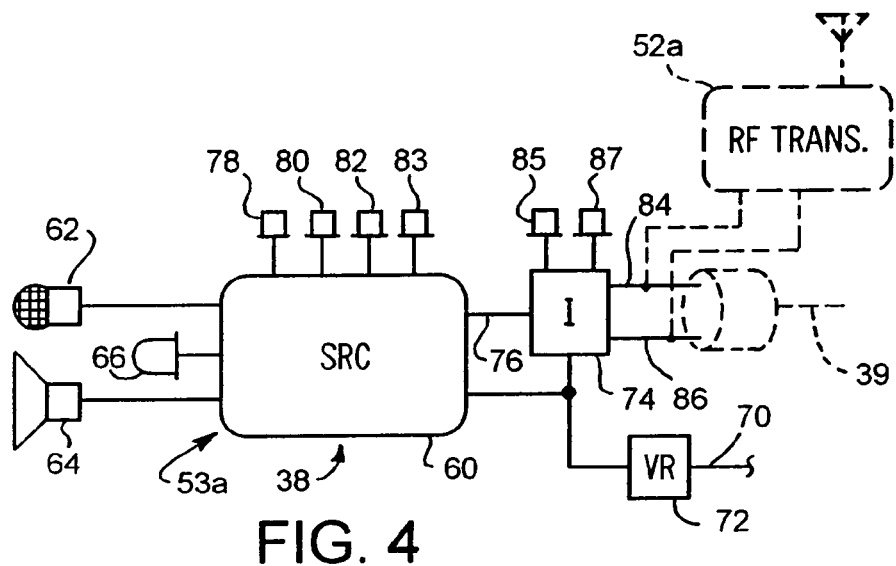
FIG. 4 is a generalized schematic diagram of a fixed interior speech activated controller for the operator system.

Referring now to FIG. 4, there is illustrated a somewhat general diagram of the interior wall mounted controller 38. The controller 38 may be connected to a source of electrical power, such as a battery, not shown, or a household electrical circuit, and suitable transformer and rectifier, if required, also not shown. A power source conductor 70 is shown connected to a suitable voltage regulator 72 for regulating the electrical power available at conductor 70 to that required for a speech activation unit 53a including a circuit or module 60 and for that required by a suitable interface circuit 74 operable to receive output signals from the module 60 by way of conductor means 76. Controller 38 may be operated through the module 60 by speech commands issued to the microphone 62. Instructional commands are given by the module 60 through the audio speaker 64. Suitable momentary, push button switches 78, 80 and 82 are associated with the module 60 for resetting the module, training the module to recognize spoken words in a speaker dependent or speaker independent mode and activating the module when a word is to be spoken to issue a command to produce an output signal at conductor means 76 to the interface circuit 74. Alternatively, the module 60 may be operable to continuously listen for a pre-programmed command word or words in a speaker dependent or speaker independent mode. When a signal is produced at conductor means 76 to the interface circuit 74, output command signals are produced on conductor means 84 or 86 to control the light 33 or the door 20, respectively. A push button switch 83 is operable to place module 60 in the continuous listening mode. Push button momentary switches 85 and 87 may be provided, as shown, and are available to operate the light 33 and door 20 directly, if desired. The controller 38 may also, in an alternate arrangement, include a radio transmitter 52a, FIG. 4, suitably connected to the circuit 74 for transmitting commands to the receiver of base controller 36 in place of the signal conductor 39.

Figure 5:
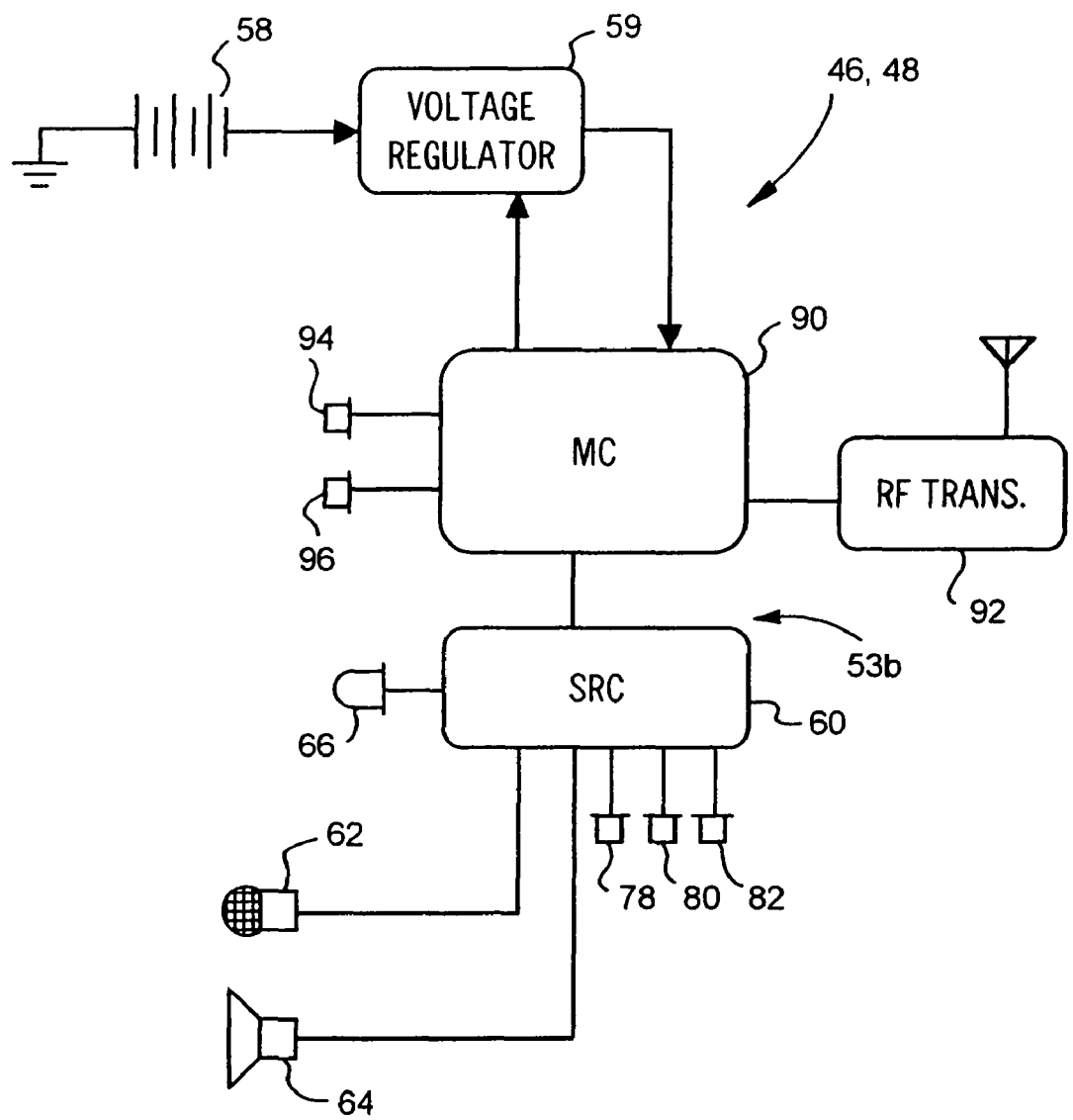
FIG. 5 is a generalized schematic diagram of one of the remote, portable controllers for the speech activated control system of the present invention.

Referring now to FIG. 5, there is illustrated a somewhat generalized schematic diagram of the controllers 46 and 48 which may be identical, as indicated. Each of the controllers 46 and 48 includes a microcontroller 90 connected to a suitable radio frequency (RF) transmitter 92 for transmitting signals to the RF receiver of the base controller 36. The microcontroller 90 may be of a type which is operable to transmit a so-called rolling code signal by way of the transmitter 92 in accordance with the teaching of U.S. Pat. No. 6,049,298, issued Aug. 11, 2000 to Dennis Waggamon et al and assigned to the assignee of the present invention. The microcontroller 90 may receive input signals from one or more so-called push button switches 94 and 96 to send a selected coded signal by way of the transmitter 92 to command separate operations, such as to open one or more doors. Microcontroller 90 is operated via a source of power, such as a battery 58, or an onboard vehicle power source, not shown, and a voltage regulator 59.

The battery 58 or other power source also supplies electrical power to a speech activation unit 53b including a speech recognition module 60 operably connected to the microcontroller 90 to a microphone 62, an audio speaker 64 and further to an indicator light 66. Suitable "reset", "train" and "recognition" switches 78, 80 and 82 may also be associated with the module 60. However, the module 60 may also be operated in a continuous listening mode for a spoken word command received by the module 60 by way of the microphone 62 to effect transmission of a signal from the transmitter 92 by way of the microcontroller 90 to provide operational signals, such as for opening or closing the door 20, for example.

Accordingly, the garage door operator system 10 may utilize speech activation control or manual control at multiple stations or controllers. Such control may provide for turning on and off lighting associated with the garage or enclosure 14, for operation of the door 20 to move between open and closed positions, and/or to command the performance of other functions which would be desirably controlled from the controllers associated with the system 10.

Figure 6A:
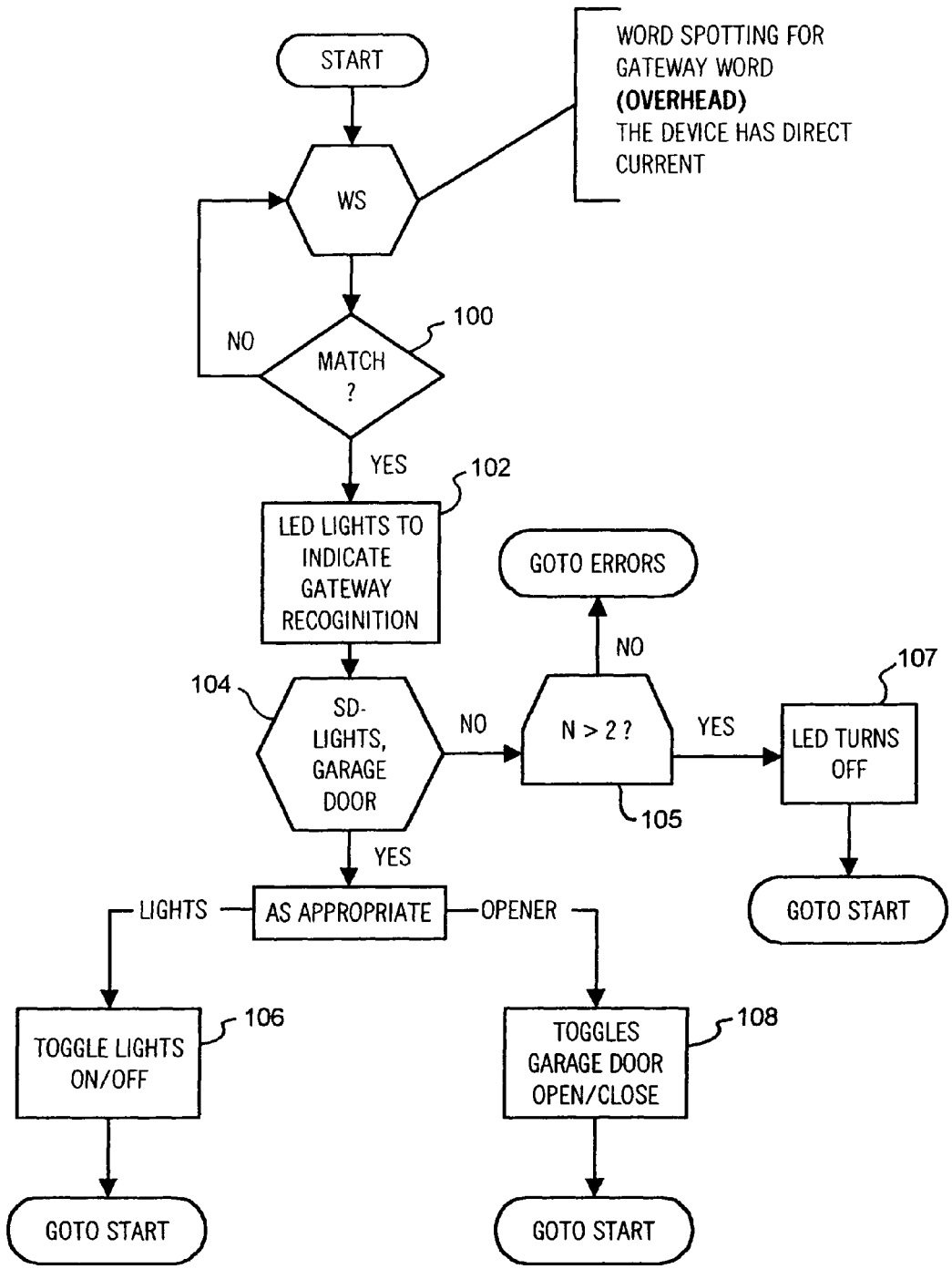
FIG. 6A through 6D comprise flow diagrams for certain steps carried out by one or more of the controllers for the system shown in FIG. 1.

Referring now to FIG. 6A, there is illustrated a flow diagram for general operation of the speech recognition module 60 for the respective remote controllers 38, 46, 48 and 50. Typically, the module 60 is trained to recognize a gateway word, such as "Overhead", entered into the circuitry of the module 60 followed by command words, such as "lights" or "garage door". With regard to the controller 38, if this controller, having a continuous source of power, is operated in the continuous listening mode and receives a speech command comprising a gateway word, such as "Overhead" and the module 60 matches the spoken word with a pre-programmed word which it recognizes as indicated at step 100, the indicator light 66 is illuminated to indicate gateway word recognition, as indicated at step 102. Once the indicator 66 is illuminated, the speaker (person) is prompted to enunciate a command word such as "lights" or "garage door". When a word or words is enunciated at step 104 of FIG. 6A and the module 60 recognizes the command, the process proceeds to steps 106 or 108 wherein an appropriate signal is sent by way of interface circuit 74, or the transmitter 52 or one of the transmitters 92 to effect turning the light 33 on or off, depending on the previous condition, or opening or closing the door 20, also depending on the previous condition.

Figure 6B:
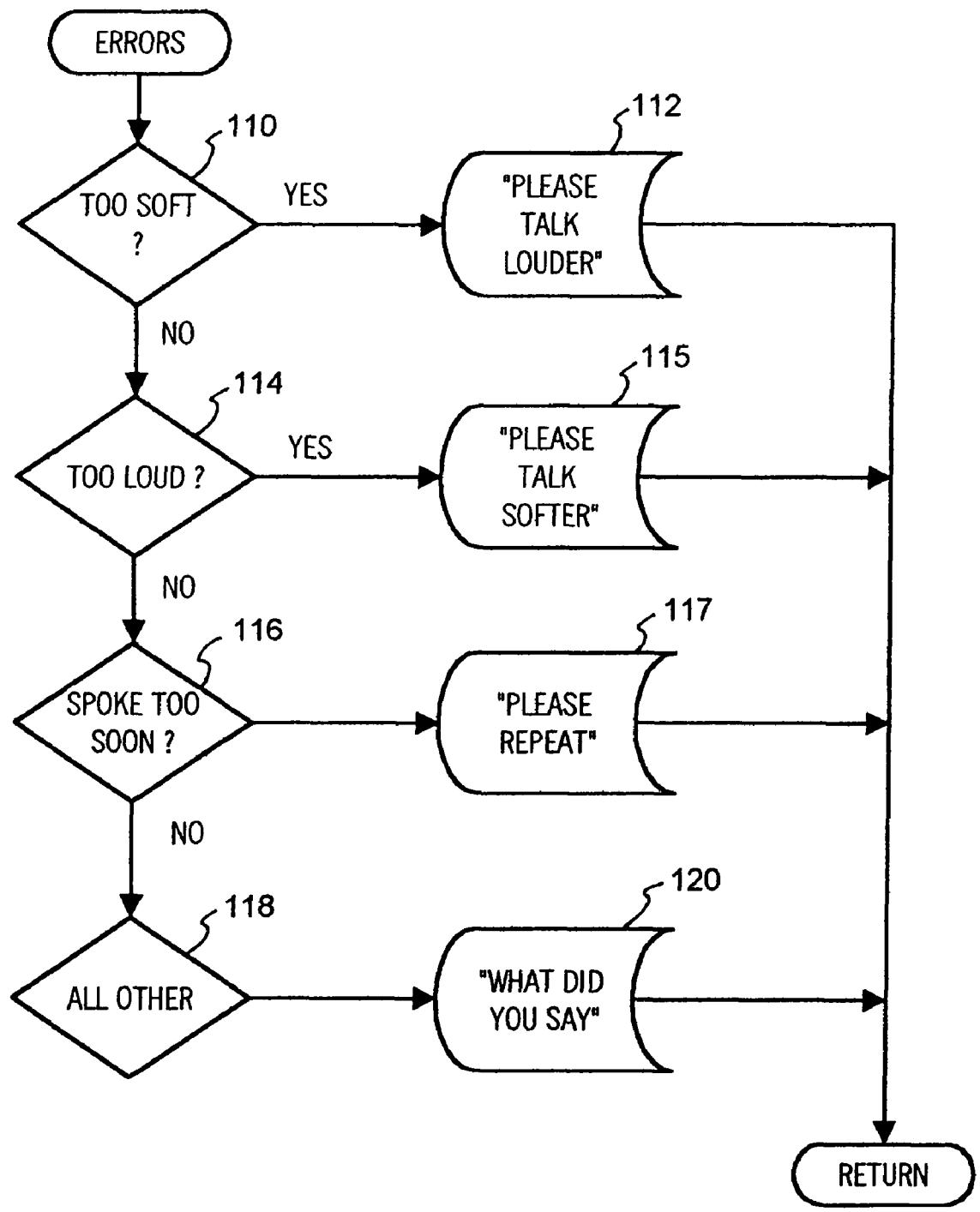

However, if the module 60 does not recognize the speaker dependent or speaker independent words spoken at step 104, the module 60 effects operation of an error process as indicated in FIG. 6B, depending on the error condition. For example, if the word or words spoken at step 104 are too soft, as indicated at step 110 in FIG. 6B, the module 60 causes a synthesized voice to be enunciated by the speaker 64 to say "please talk louder" as indicated at step 112. If the module 60 fails to recognize the spoken word because of other errors, such as indicated at steps 114 or 116, the module 60 effects enunciation via the speaker 64 according to the commands of steps 115 or 117, respectively. If the error in the spoken word is not recognizable, such as indicated at step 118, the person speaking is asked via module 60 and speaker 64 to repeat the command, as indicated at step 120 of FIG. 6B. The module 60 may be programmed to go through two error cycles, for example, as indicated at step 105 in FIG. 6A, and if it exceeds that number of cycles, the indicator 66 is extinguished and the person attempting to effect operation of one of the controllers 38, 46, 48 or 50 is required to commence the process of FIG. 6A all over again.

Figure 6C:
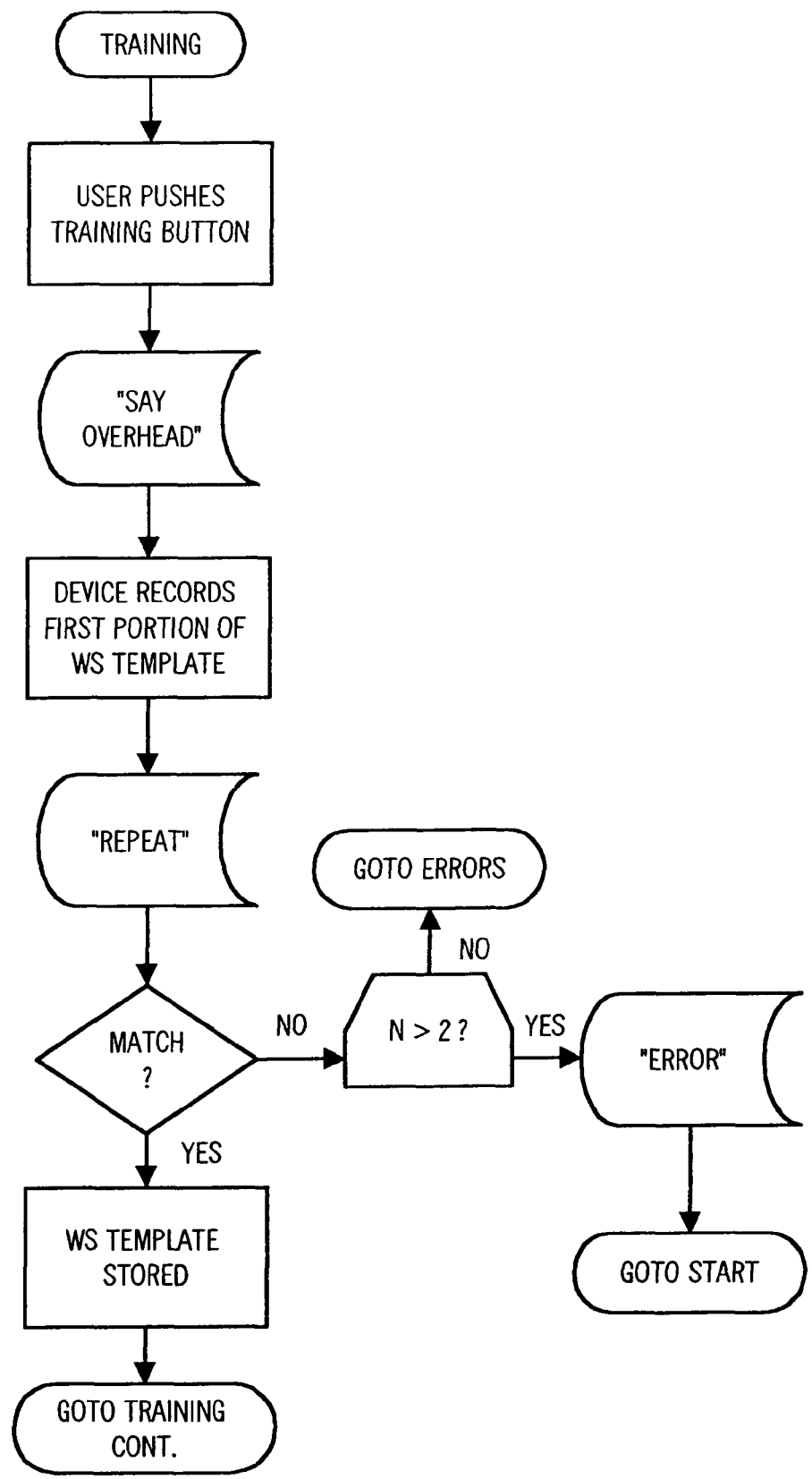
Figure 6D:
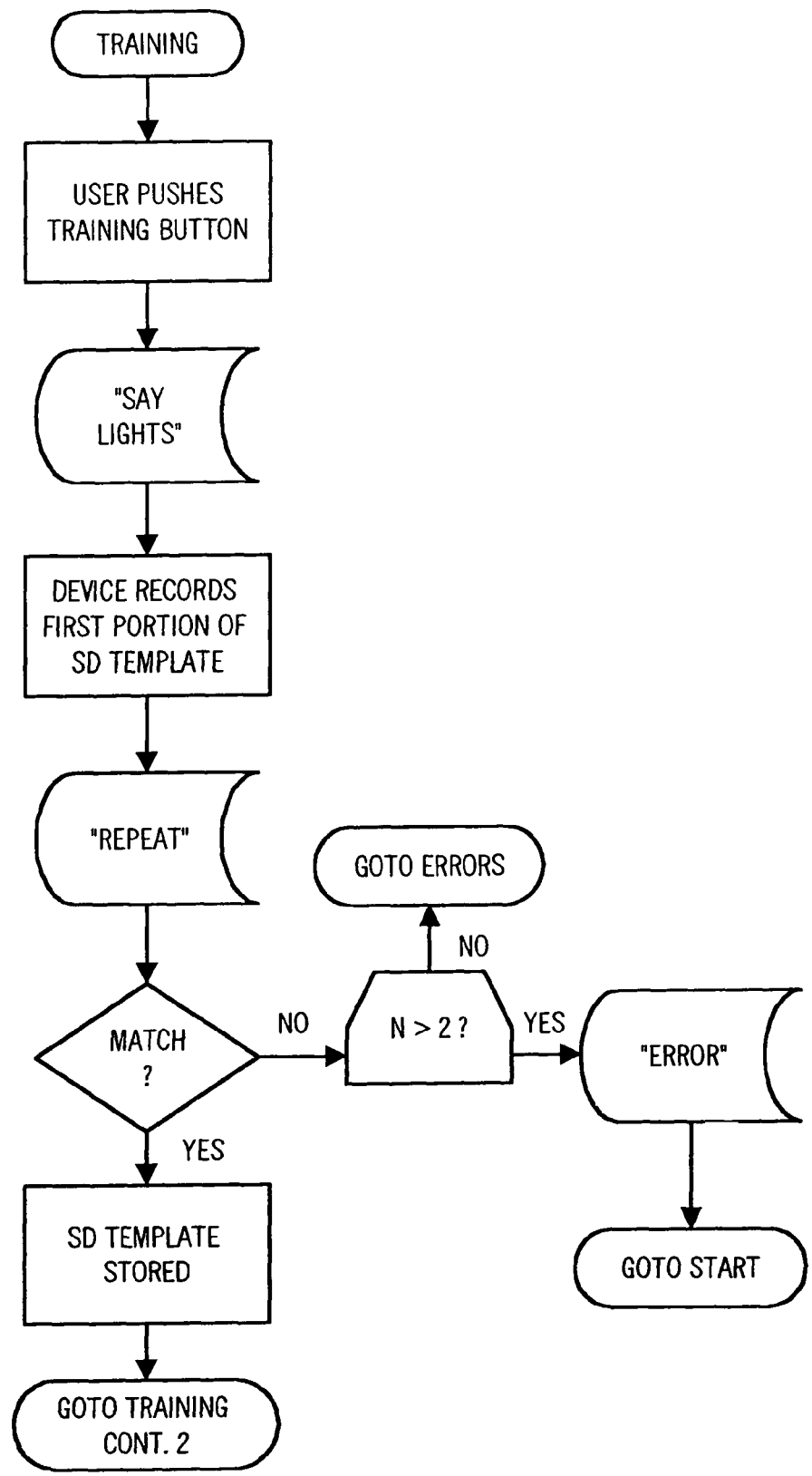

FIGS. 6C and 6D illustrate steps in the process of training the module 60 of one of the controllers 38, 46, 48 or 50 to recognize the spoken gateway word or command word when the module 60 is operating in the speaker dependent mode. Accordingly, module 60 may be pre-programmed to recognize specific commands such as "Overhead", "lights", and "garage door". However, the module 60 is required to train itself to recognize a particular speech pattern as indicated by the diagrams of FIGS. 6C and 6D. In this operating mode, each of the module 60 is operated by activation of its associated "training" switch followed by the flow of steps indicated in FIGS. 6C and 6D to effect training the module to recognize a word or words as well as an authorized user's particular speech characteristics if the modules 60 are adapted for operation in the speaker dependent mode.

The construction and operation of the door operator system 10 described above is believed to be within the purview of one skilled in the art based on the foregoing description. Although a preferred embodiment of a door operator system has been disclosed in detail herein, those skilled in the art will also recognize that various substitutions and modifications may be made without departing from the scope and spirit of the appended claims.

What is claimed is:

1. A garage door system for moving a garage door between open and closed positions, said garage door system comprising:
    a lighting system;
    a mechanism operably connected to said garage door for moving said garage door between said open and closed positions;
    a base controller operably associated with said mechanism for causing said mechanism to move said garage door; and
    a wall-mounted controller in wireless communication with said base controller, said wall-mounted controller including a speech recognition module programmable for indicating when acceptable voice communications have been input to said module in order to effect at least one of energizing said lighting system, de-energizing said lighting system, and operation of said mechanism for moving said garage door between said open and closed positions, said acceptable voice communications including an oral reference connoting energizing the lighting system, an oral reference connoting de-energizing the lighting system, or an oral reference connoting a command to open or close said garage door.

2. The garage door system as set forth in claim 1, said wall-mounted controller further comprising:
a radio frequency (RF) transmitter operable to transmit a radio frequency signal to said base controller; and
a microcontroller operably connected to said RF transmitter and to said speech recognition module, said microcontroller operable to transmit a signal to said RF transmitter when acceptable voice communications have been input to said module.

3. The garage door system as set forth in claim 2, wherein said microcontroller is operable to provide a rolling code signal for transmission by said RF transmitter to said base controller.

4. The garage door system as set forth in claim 2, wherein said wall-mounted controller includes a keypad operably connected to said microcontroller and operable to provide a signal to said microcontroller to command operation of said RF transmitter.

5. The garage door system as set forth in claim 1, wherein said speech recognition module includes a microphone for receiving said voice communications.

6. The garage door system as set forth in claim 1, wherein said speech recognition module is operable to respond to said voice communications in a speaker dependent mode.

7. The garage door system as set forth in claim 1, wherein said speech recognition module is operable to continuously listen for one or more of said acceptable voice communications.

8. The garage door system as set forth in claim 1, wherein said wall-mounted controller further includes a manually actuatable switch for effecting operation of said garage door to move between said open and closed positions.

9. The garage door system as set forth in claim 1, wherein said wall-mounted controller includes a multi-digit keypad.

10. The garage door system as set forth in claim 1, wherein said acceptable voice communications further includes one or more gateway words.

11. A garage door system for moving a garage door between open and closed positions, said garage door system comprising:
a lighting system;
a mechanism operably connected to said garage door for moving said garage door between said open and closed positions;
a base controller operably associated with said mechanism for causing said mechanism to move said garage door; and
a remote controller in wireless communication with said base controller, said remote controller including a speech recognition module programmable for indicating when acceptable voice communications have been input to said module in order to effect at least one of energizing said lighting system, de-energizing said lighting system, and operation of said mechanism for moving said garage door between said open and closed positions, said acceptable voice communications including an oral reference connoting energizing the lighting system, an oral reference connoting de-energizing the lighting system, or an oral reference connoting a command to open or close said garage door.

12. A garage door system for moving a garage door between open and closed positions, said garage door system comprising:
a lighting system;
a mechanism operably connected to said garage door for moving said garage door between said open and closed positions;
a base controller operably associated with said mechanism for causing said mechanism to move said garage door; and
a controller in wireless communication with said base controller, said controller including a biometric responsive module programmable for indicating when acceptable communications have been input to said module in order to effect at least one of energizing said lighting system, de-energizing said lighting system, and operation of said mechanism for moving said garage door between said open and closed positions, said acceptable communications including a command to energize the lighting system, a command to de-energize the lighting system, or a command to open or close said garage door.

13. The garage door system as set forth in claim 12, wherein said biometric module comprises a speech recognition module.

14. The garage door system as set forth in claim 12, said controller further comprising:
a radio frequency (RF) transmitter operable to transmit a radio frequency signal to said base controller; and
a microcontroller operably connected to said RF transmitter and to said biometric module, said microcontroller operable to transmit a signal to said RF transmitter when acceptable communications have been input to said module.

15. The garage door system as set forth in claim 12, wherein said acceptable communications further includes one or more gateway words.

16. A garage door system for moving a garage door between open and closed positions, said garage door system comprising:
a lighting system;
a mechanism operably connected to said garage door for moving said garage door between said open and closed positions;
a base controller operably associated with said mechanism for causing said mechanism to move said garage door;
a speech recognition module programmable for indicating when acceptable voice communications have been input to said module; and
a wall-mounted controller in operable communication with said base controller and said speech recognition module, for transmitting access codes to said base controller in response to indication by said module of acceptable voice communications to thereby effect at least one of energizing said lighting system, de-energizing said lighting system, and operation of said mechanism for moving said garage door between said open and closed positions, said acceptable voice communications including an oral reference connoting energizing the lighting system, an oral reference connoting de-energizing the lighting system, or an oral reference connoting a command to open or close said garage door.

17. The garage door system as set forth in claim 16, wherein said access codes are transmitted by radio frequency transmission.

18. The garage door system as set forth in claim 16, wherein said access codes are transmitted by wires.

19. The garage door system as set forth in claim 16, wherein said acceptable voice communications further includes one or more gateway words.

20. A garage door system for moving a garage door between open and closed positions, said garage door system comprising:
- a lighting system;
- a mechanism operably connected to said garage door for moving said garage door between said open and closed positions;
- a base controller operably associated with said mechanism for causing said mechanism to move said garage door;
- a speech recognition module programmable for indicating when acceptable voice communications have been input to said module; and
- a remote controller in operable communication with said base controller and said speech recognition module, for transmitting access codes to said base controller in response to indication by said module of acceptable voice communications to thereby effect at least one of energizing said lighting system, de-energizing said lighting system, and operation of said mechanism for moving said garage door between said open and closed positions, said acceptable voice communications including an oral reference connoting energizing the lighting system, an oral reference connoting de-energizing the lighting system, or an oral reference connoting a command to open or close said garage door.

21. A garage door system for moving a garage door between open and closed positions, said garage door system comprising:
- a lighting system;
- a mechanism operably connected to said garage door for moving said garage door between said open and closed positions;
- a base controller operably associated with said mechanism for causing said mechanism to move said garage door;
- a speech recognition module programmable for generating an actuation signal when acceptable voice communications have been input to said module, said acceptable voice communications including an oral reference connoting energizing the lighting system, an oral reference connoting de-energizing the lighting system, or an oral reference connoting a command to open or close said garage door; and
- a wall-mounted controller in operable communication with said base controller and said speech recognition module, for transmitting access codes to said base controller in response to said actuation signal received from said speech recognition module to thereby effect at least one of energizing said lighting system, de-energizing said lighting system, and operation of said mechanism for moving said garage door between said open and closed positions.

22. The garage door system as set forth in claim 21, wherein said access codes are transmitted by radio frequency transmission.

23. The garage door system as set forth in claim 21, wherein said access codes are transmitted by wires.

24. The garage door system as set forth in claim 21, wherein said acceptable voice communications further includes one or more gateway words.

25. A garage door system for moving a garage door between open and closed positions, said garage door system comprising:
- a lighting system;
- a mechanism operably connected to said garage door for moving said garage door between said open and closed positions;
- a base controller operably associated with said mechanism for causing said mechanism to move said garage door;
- a speech recognition module programmable for generating an actuation signal when acceptable voice communications have been input to said module, said acceptable voice communications including an oral reference connoting energizing the lighting system, an oral reference connoting de-energizing the lighting system, or an oral reference connoting a command to open or close said garage door; and
- a remote controller in operable communication with said base controller and said speech recognition module, for transmitting access codes to said base controller in response to said actuation signal received from said speech recognition module to thereby effect at least one of energizing said lighting system, de-energizing said lighting system, and operation of said mechanism for moving said garage door between said open and closed positions.

* * * * *